4 Sheets—Sheet 1

W. AIKEN,

Assignor, by mesne assignments, to W. COREY.

Machine for Making the Tongues of Machine Knitting-Needles.

No. 9,206. Reissued May 18, 1880.

Witnesses.
J. T. Cronin
L. F. Connor.

Inventor.
Walter Aiken
by Crosby Gregory Attys.

4 Sheets—Sheet 2.

W. AIKEN,

Assignor, by mesne assignments, to W. COREY.

Machine for Making the Tongues of Machine Knitting-Needles.

No. 9,206. Reissued May 18, 1880.

Witnesses.
J. T. Cronin
L. F. Connor

Inventor.
Walter Aiken.
by Crosby & Gregory Attys

4 Sheets—Sheet 3.
W. AIKEN,
Assignor, by mesne assignments, to W. COREY.
Machine for Making the Tongues of Machine Knitting-Needles.
No. 9,206. Reissued May 18, 1880.
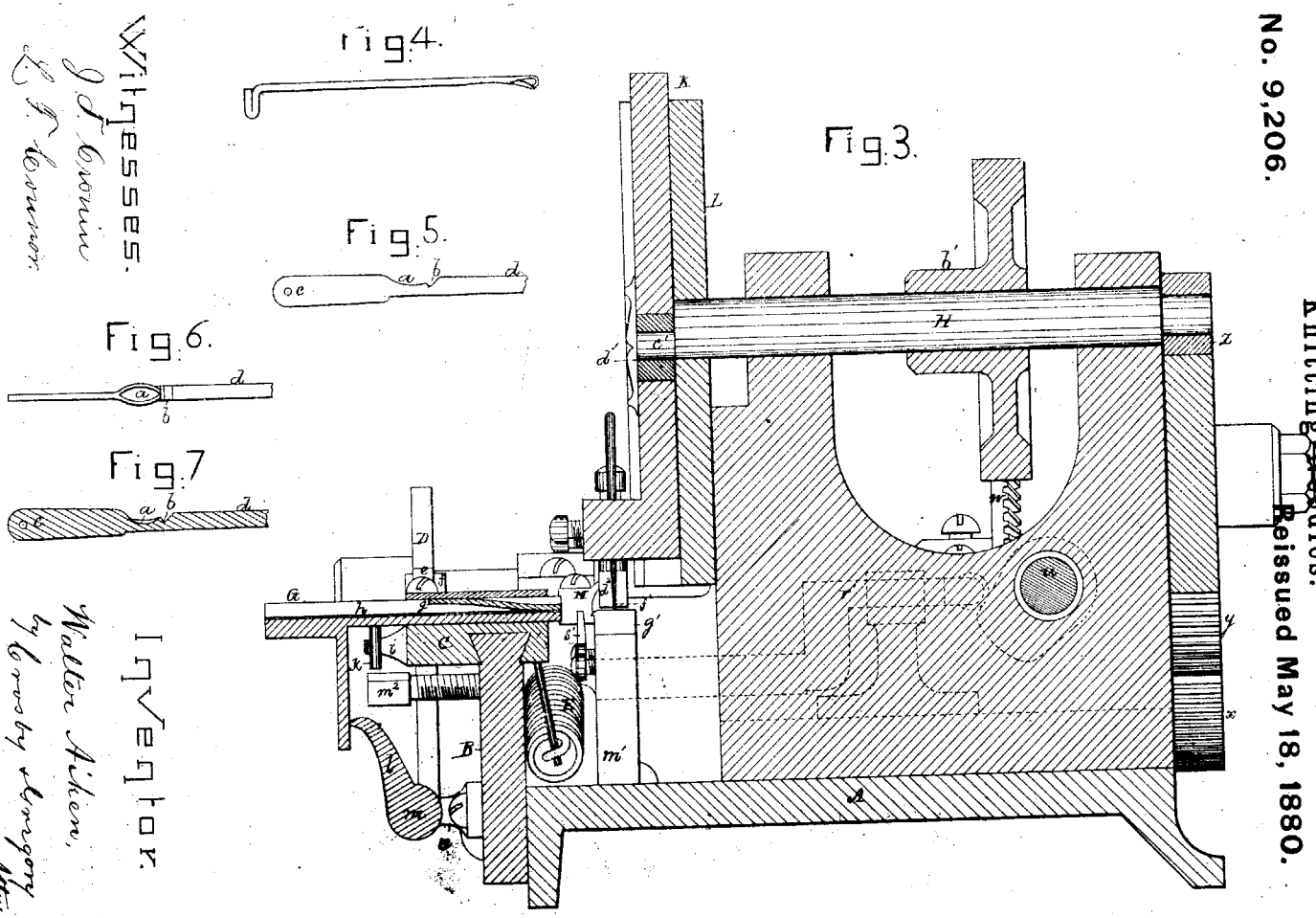
Witnesses.
J. F. Cronin
L. F. Connor.
Inventor.
Walter Aiken,
by Crosby & Gregory
Attys.

W. AIKEN,
Assignor, by mesne assignments, to W. COREY.

Machine for Making the Tongues of Machine Knitting-Needles.

No. 9,206. Reissued May 18, 1880.

Witnesses.
J. F. Cronin
L. F. Connor.

Inventor.
Walter Aiken.
by Crosby & Gregory.
Attys

UNITED STATES PATENT OFFICE.

WALTER AIKEN, OF FRANKLIN, NEW HAMPSHIRE, ASSIGNOR, BY MESNE ASSIGNMENTS, TO WILLIAM COREY.

MACHINE FOR MAKING THE TONGUES OF MACHINE KNITTING-NEEDLES.

SPECIFICATION forming part of Reissued Letters Patent No. 9,206, dated May 18, 1880.

Original No. 70,678, dated November 12, 1867. Application for reissue filed November 13, 1879.

*To all whom it may concern:*

Be it known that I, WALTER AIKEN, of Franklin, in the county of Merrimac, State of New Hampshire, have invented a new and useful Machine for Making the Tongues of Knitting-Machine Needles, of which the following description, in connection with the accompanying drawings, is a specification.

This invention relates to automatic mechanism for the manufacture of the tongues of knitting-machine needles; and it consists, chiefly, in the organization, in one machine, of a feeder or holder for the wire to be formed into tongues, and means to present the wire in proper succession to the action of dies to form the bowl of the tongue, to flatten the sides of the wire beyond the bowl, punch a hole through the wire for the reception of the rivet which serves as a pivot for the tongue, and round or shape the end of the tongue near the rivet-hole, as will be hereinafter fully described.

Figure 1:
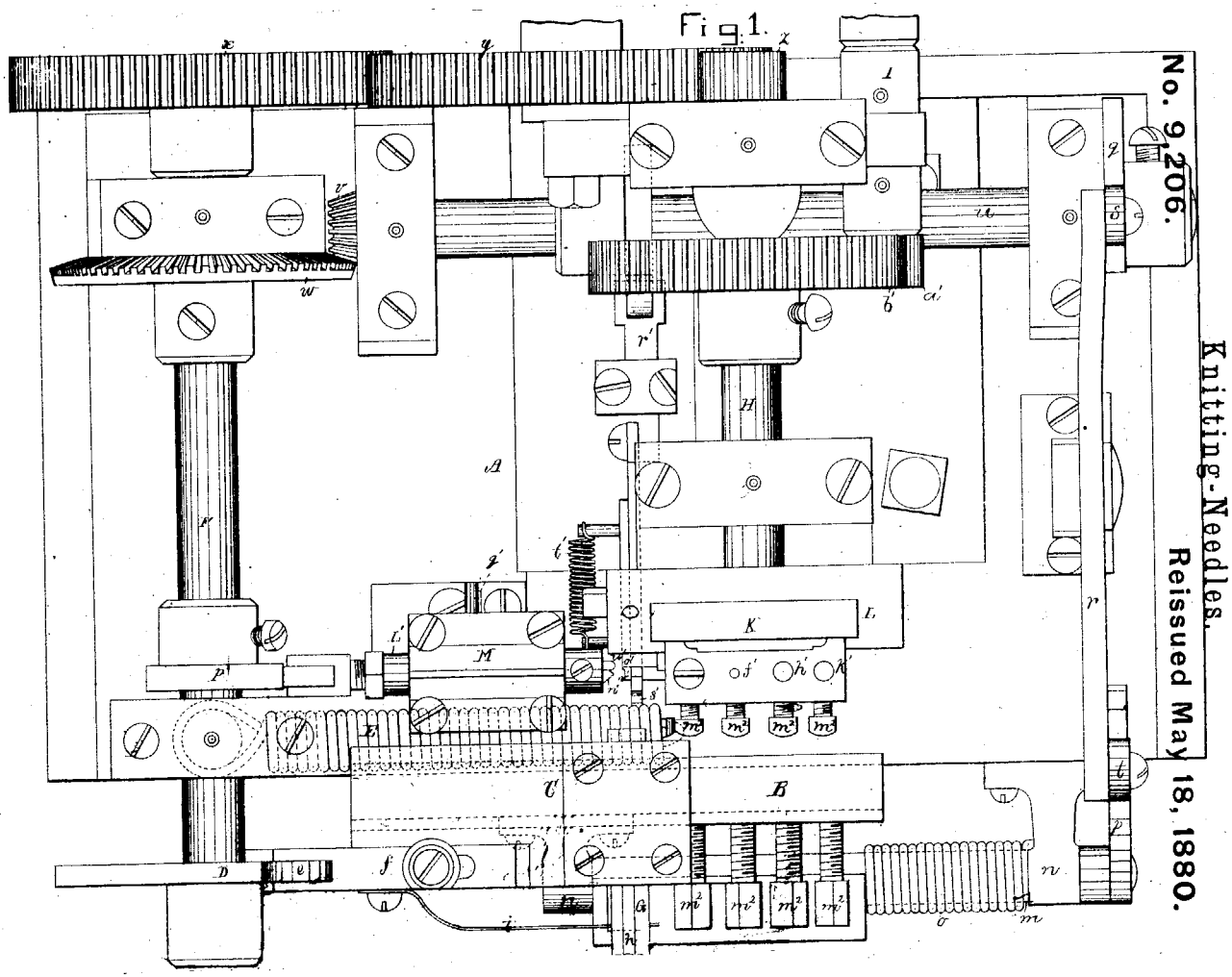
Figure 2:
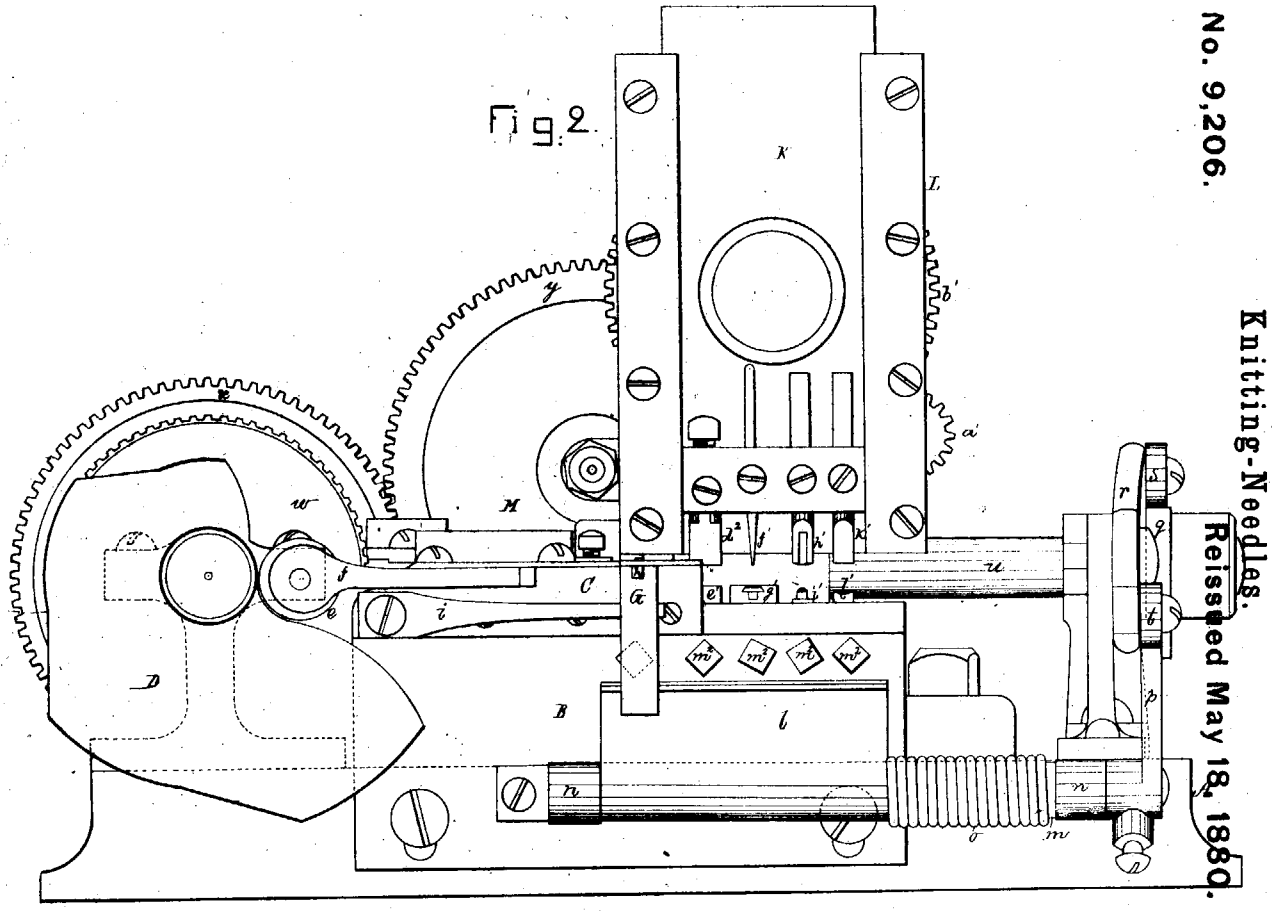
Figure 8:
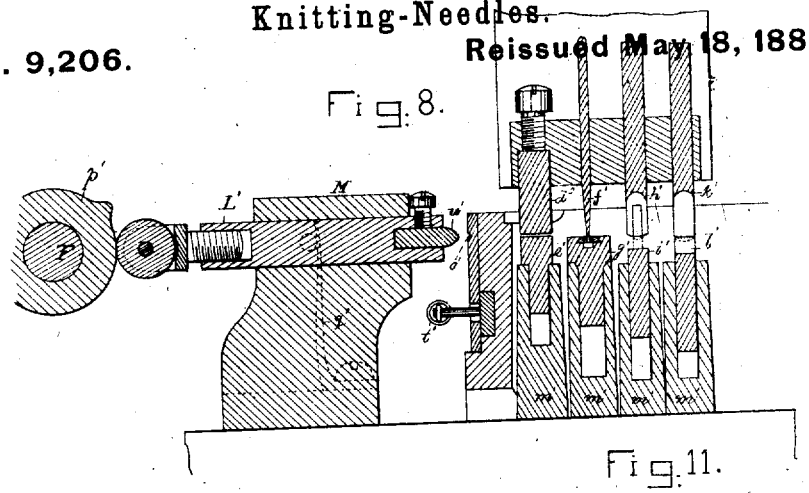
Figure 11:
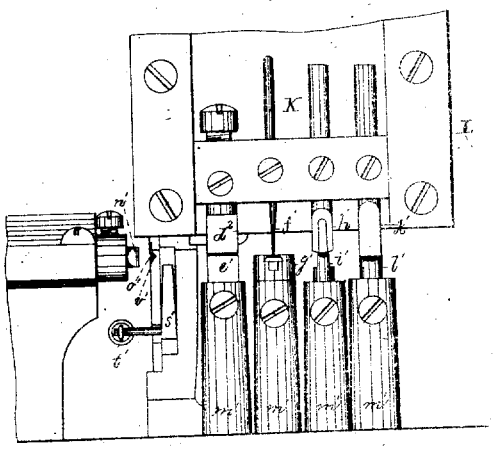
Figure 9:
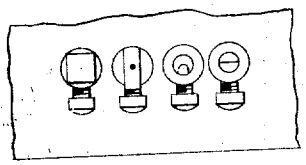
Figure 10:
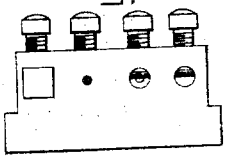
Figure 12:
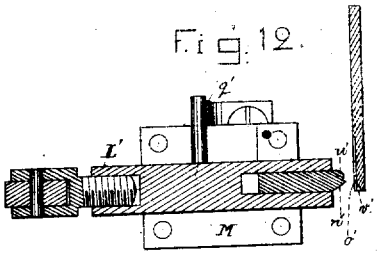

Figure 1 is a top view, Fig. 2 a front elevation, and Fig. 3 a transverse section, of it. Fig. 4 is a side view of a knitting-machine needle with its tongue. Fig. 5 is a side view, Fig. 6 an under-side view, and Fig. 7 a longitudinal section, of a needle-tongue as made by this machine. Fig. 8 is a vertical section of the said dies and punch. Fig. 9 is a top view of the lower dies. Fig. 10 is a bottom view of the upper dies. Fig. 11 is a front elevation of all the dies and the punch. Fig. 12 is a horizontal section of the dies for nicking the wire and making the bowl.

The said Figs. 5, 6, and 7 show the tongue and shank-piece on an enlarged scale.

In the drawings, A denotes the base-plate of the machine, having attached to it a rail, B, that supports a block or carriage, C, which is applied to the said rail so as to be capable of being slid lengthwise thereon.

The intermittent movements of the carriage and its subsequent retraction are effected by a cam, D, and a spring, E, arranged in a manner as represented, the cam being fixed on a shaft, F, and working against a friction-wheel, *e*, arranged on an arm, *f*, projecting from the carriage.

The carriage contains a grooved bar or feeder, G, adapted to slide therein in a direction at right angles to the movement of the carriage, and a friction-spring, *g*, arranged within the groove *h* of the bar or feeder, holds the wire down against the bottom of the said groove. A spring, *i*, acting against a pin, *k*, extending down from the feeder G, serves to advance it toward the dies, and the retraction of the feeder at the proper period is effected by a broad arm, *l*, extended from a rocker-shaft, *m*, arranged in bearings *n n*, projecting from the front edge of the base-plate, a helical spring, *o*, encompassing the rocker-shaft and moving it to cause the retraction of the feeder.

The rocker-shaft is moved in the opposite direction at the proper times to enable the feeder to be advanced by an arm, P, extended from one end of the rocker-shaft, it being acted upon by a roller, *t*, of a lever, *r*, the said lever having a roller, *s*, which is acted upon by the cam *q*, fixed to a cross-shaft, *u*, driven from the cam-shaft F by means of the two beveled gears *v w*, and such shaft F is engaged with another shaft, H, by means of a train of spur-gears, *x y z*. The shaft H, provided with gear *b'*, is driven from the gear *a'* on the driving-shaft I.

At the front end of shaft H is an eccentric, *c'*, which extends into an opening or slot, *d'*, in the plunger K, guided in the standard L, so as to be reciprocated vertically therein by the said eccentric *c'*, said standard being erected on the base-plate and serving to support the bearings of the shafts H and I. The plunger carries the upper flattening-die, $d^2$, the punch *f'*, the upper rounding-die, *h'*, and the upper separating die or cutter, *k'*. Underneath the said punch and dies are arranged, in vertical posts *m' m' m' m'*, and so as to be adjustable thereon as may be required, the lower flattening-die, *e'*, the punch-die *g'*, the lower rounding-die, *i'*, and the lower cutter, *l'*.

In front of each of the lower dies is an adjustable stop or screw, $m^2$, which is screwed into the rail B from its front side. These stops serve to arrest the feeder, or stop it at its proper distance from each pair of dies, when directly in front of such pair.

The dies for nicking the wire and punching the bowl are shown at *n' o' w' x'*, the dies *n'* and *w'* being movable, and the dies *o' x'* being stationary. The dies $n'$ and $u'$ are fixed to a plunger, L′, which slides horizontally through a box, M, and are forced forward by a cam, $p'$, on the shaft F, and retracted by a spring, $q'$, arranged as represented.

The slider or plunger $r'$ (see Fig. 1 and dotted lines Fig 3) carries a finger, $s'$, which acts to force back the feeder while the wire is held by the dies $u'$ $o'$, so as to move the feeder back along the wire to measure off the proper length of wire to be formed into a tongue on the respective dies, and after passing the end-rounding dies the wire is cut off by the separating-cutters. A spring, $t'$, serves to retract the plunger $r'$.

The wire to be formed into a tongue is placed in the groove of the feeder, and is by it presented to the action of the dies $n'$ $v'$ to nick the neck $b$, and the dies $u'$ $o'$ to make the spoon-shaped bowl $a$. Then the carriage and feeder are moved to present the wire to the action of the flattening-dies $d^2$ $e'$, by which the wire is flattened on its opposite sides, after which the feeder removes the flattened wire into position between the punch $f'$ and die $g'$, where a hole, $c$, is made through the flattened part of the wire for the pivot of the tongue. Then the feeder removes the wire to the dies $h'$ $i'$, which round or cut the end of the tongue about the end through which the hole $c$ was punched, as at Fig. 5, after which the wire is moved by the feeder between the severing or cutting dies $k'$ $l'$, which cut off the wire beyond the nick $b$, leaving the shank-piece $d$, by which to handle the tongue while it is being placed in position and pivoted to the body of the needle, the said shank-piece being broken off by the workman after the tongue is pivoted; and, finally, the carriage and feeder are retracted to their original positions, ready to be again advanced to present the wire for a new tongue.

Heretofore it has been common to form sewing-needles and barbed needles for knitting-machines by means of machinery embodying mechanism for feeding forward wire in needle-lengths to mechanism to sever such lengths, flatten one end, punch the eye therein, and dress and finish the same; but, so far as I know, no mechanism has before my invention been organized into a machine to form the bowls in the tongues or latches of latch knitting-needles, these being always, prior to my invention, formed by hand. The eyes in sewing-needles and barbed knitting-needles are not of a form for use as pivot-holes, as in my invention.

I claim—

1. In an organized machine for forming tongues for knitting-machine needles, a feeder for the wire, the dies to form the bowl, and the flattening-dies, and mechanism to operate the said parts, whereby the wire is presented by the feeder to the dies to form the bowl, and then to the dies to flatten the said wire, substantially as described.

2. Automatic mechanism for the manufacture of the tongues of knitting-machine needles, consisting in the combination of a feeder or holder for the wire to be formed into tongues and means to present the wire in proper succession to the action of a series of dies of the shapes shown to form the bowl of the tongue, to flatten the sides of the wire beyond the bowl, punch a hole through the wire for the reception of the rivet which forms the pivot for the tongue, and round or shape the end of the tongue near the rivet-hole, the combination being and operating substantially as specified.

WALTER AIKEN.

Witnesses:

LEONARD GERRISH,

ALEXIS PROCTOR.